(12) United States Patent
Jin et al.

(10) Patent No.: US 8,081,300 B2
(45) Date of Patent: Dec. 20, 2011

(54) APPARATUS AND METHOD FOR LASER RANGING

(75) Inventors: Tian Jin, Zhejiang (CN); Guojun Zheng, Zhejiang (CN); Chongqiu Liu, Hunan (CN); Yi Qun Fan, Zhejiang (CN)

(73) Assignee: Jinhua Lanhai Photoelectricity Technology Co., Ltd., Jinhua Industrial District, Zhejiang Province (CN)

( * ) Notice: Subject to any disclaimer, the term of this patent is extended or adjusted under 35 U.S.C. 154(b) by 91 days.

(21) Appl. No.: 12/538,122

(22) Filed: Aug. 8, 2009

(65) Prior Publication Data

US 2010/0045964 A1 Feb. 25, 2010

(30) Foreign Application Priority Data

Aug. 21, 2008 (CN) .......................... 2008 2 0163236
Apr. 29, 2009 (CN) .......................... 2009 1 0138155

(51) Int. Cl.
*G01C 3/08* (2006.01)
(52) U.S. Cl. ........ 356/5.01; 356/4.01; 356/4.1; 356/5.1; 356/5.15
(58) Field of Classification Search .......... 356/4.01–4.1, 356/5.01–5.15, 6–22, 28, 28.5
See application file for complete search history.

(56) References Cited

U.S. PATENT DOCUMENTS 7,623,224 B2 * 11/2009 Vogel .......................... 356/141.5
7,982,866 B2 * 7/2011 Vogel .......................... 356/141.5

* cited by examiner

*Primary Examiner* — Thomas Tarcza
*Assistant Examiner* — Luke Ratcliffe
(74) *Attorney, Agent, or Firm* — Global IP Services; Tianhua Gu

(57) ABSTRACT

The present invention relates to a method for laser ranging with high precision and high efficient, a method for identifying distance mode automatically during laser ranging process, and a laser ranger with high precision, high efficient and low power waste. The accuracy of ranging is increased through multi classes of receiving process; the accuracy of ranging is further increased through the selection of distance mode and the adjustment of receiving sensitivity before the measuring steps are executed; the accuracy of ranging is further increased through executing jitter judgment on obtained distance measured values to discard the distance measured values that do not satisfy the setting conditions and judge whether the number of remaining distance measured values satisfies the setting quantity requirement; and the present invention is also of simple structure, high measurement efficiency, and low power waste.

19 Claims, 11 Drawing Sheets

APPARATUS AND METHOD FOR LASER RANGING

CROSS REFERENCE TO THE RELATED PATENT APPLICATIONS

The present application claims priorities of the Chinese patent application No. 200820163236.7 filed on Aug. 21, 2008 and the Chinese patent application No. 200910138155.0 filed on Apr. 29, 2009, which applications are incorporated herein by reference.

FIELD OF INVENTION

The present invention relates to an apparatus for laser ranging in the field of laser range measuring, more particularly, a hand held, portable laser ranging apparatus; the present invention also relates to a method for laser ranging.

DESCRIPTION OF THE RELATED ART

Portable laser ranger is one of the development trends of laser ranger, and as an apparatus that can be carried or moved conveniently, portable laser ranger is widely used in engineering projects, such as architecture, traffic and etc., and in sports entertainment, such as golf, hunt and etc. The power supply for portable laser ranger usually depends on battery, which puts a higher requirement for the low power-waste, the system stability, and the measurement accuracy performances of laser ranger.

The disadvantages of apparatus and method for laser ranging disclosed in U.S. Pat. Nos. 5,612,779, 6,226,077, 5,652,651 and 5,926,259 are described as follows:

(1) The ranging accuracy is low;
(2) The power waste is large, which makes the range finders do not meet the mini-type and portable requirements thereof. The drive voltage for emitting laser pulses is from 110V to 140V, and the bias voltage of avalanche diode in receiving circuit is 50V or higher. The high voltages aforementioned are acquired through raising up a low-tension battery by a booster circuit and then dividing the gotten high voltage, which is of low conversion efficiency and high power waste, and brings interferences and radiations to the circuit of apparatus, furthermore, influences the ranging stability of laser ranger.
(3) The operation of exiting laser ranger as disclosed in U.S. Pat. No. 5,926,259 is complicated, and the error of which is bigger as well by reason of the manual choice of distance modes according to different weather condition and measured object;
(4) Lack of anti-shake function. Any kinds of tiny shaking of hand-hold side are enlarged more and more tremendous in measured object side while the distance between measured object and laser ranger is getting larger, and a bigger deviation is formed. So the excellent shaking identification function is powerful for the accuracy of a laser ranger.

SUMMARY OF THE INVENTION

The first object of present invention is to provide a method for laser ranging with high precision and high efficient;

The second object of present invention is to provide a method for identifying distance mode automatically during laser ranging process;

The third object of present invention is to provide a laser ranger with high precision, high efficient and low power waste.

According to one exemplary embodiment, the present invention relates to a method for laser ranging, which comprises the steps of:

(1) Select a distance mode and then adjust the receiving sensitivity of reflected signal according to selected distance mode;

(2) Set the number of laser pulse groups emitted during a measurement process as $G_D$, the number of laser pulses included in one laser pulse group as $I_D$, the maximum of absolute difference between two measured distance values arranged consecutively in first class receiving process as $D_A$, the maximum of absolute difference between two virtual distance values sequenced consecutively in second class receiving process as $D_B$, the minimum number of distance values included in an element association with maximum length gotten from each laser pulse group in the first class receiving process as D;

(3) Emit $G_D$ laser pulse groups to a target in a way of time diversity, each of the laser pulse group includes $I_D$ ranging pulses with the same period, the ranging pulses reflect by the target and receive by a receiving circuit, $I_D$ measured distance values correspondence to each of the ranging pulses are obtained after computing, and then execute Step (4) and Step (5) in turn on each laser pulse group;

(4) First-class receiving process: arrange the $I_D$ measured distance values according to the numerical value thereof; compute the difference between two consecutive measured distance values; the measured distance values sequenced consecutively and whose absolute difference values are smaller than or equal to the maximum absolute difference value $D_A$ are combined in one element association, and the element association with the maximum element quantity is set to be a maximum length element association $D_{max}$ of current group;

(5) Set the number of measured distance values included in the maximum length element association $D_{max}$ as x; compare x and set minimum number of distance values included in an element association with maximum length gotten from one laser pulse group D, if $x \geq D$, the laser pulse group that the maximum length element association $D_{max}$ belongs to is effective; process the x measured distance values by means of mean smoothing, and then obtain a first-class distance computation value; save the first-class distance computation value and return to Step (3) to process the measured distance values obtained from the next group of laser pulses; if the laser pulse group processed in this step is the last group of laser pulse, execute the subsequent steps; if x<D, the laser pulse group that the maximum length element association $D_{max}$ belongs to is noneffective, emit another group of laser pulse, and execute Step (4) and Step (5) in order to obtained $I_D$ measured distance values;

(6) Second class receiving process: arrange saved virtual distance values according to the numerical value thereof; compute the difference between two consecutive virtual distance values; the virtual distance values sequenced consecutively and whose absolute difference values are smaller than or equal to the maximum absolute difference value $D_B$ are combined in one element association, and the element association with the maximum element quantity is set to be a maximum length element association for second class receiving processing $D'_{max}$; the number of virtual distance values included in the maximum length element association $D'_{max}$; is set as y;

(7) Process the y virtual distance values by means of mean smoothing, and obtain a second class distance computation value, output the second class distance computation value as the result of current measurement process; end the measurement.

The final measurement result is obtained by emitting multi groups of laser pulses, calculating and adjusting to get virtual first class distance measured value of each groups of laser pulses, and executing the second receiving process on multi first class distance measured values. When the first class distance computation value is determined to be noneffective for each group of laser pulses emitting in Step (3), another group of laser pulses will be emit; as a substitution, execute Step (4) to Step (5) to $I_D$ distance measured values gotten from the re-emitted laser pulse group till a virtual first class computation value is gotten; and then, go back to process distance measured values gotten from the next group of laser pulses; if the process aforementioned is the executed on the last emitting group of laser pulses of Step (3), go to subsequent steps. The execution of Step (5) ensures the number of samples of distance measured values gotten from each group of laser pulses; the first class distance computation value obtained on the basis of a certain amount of distance measured values is more accurate. The second class receiving process executed after Step (5) is a farther process on multi virtual distance values gotten from the first class receiving process to increase the accuracy of measurement to a higher level.

As the first preferable embodiment, the minimum number of distance virtual values included in the maximum length element association of the second class receiving process E and the time limit of one measurement $T_n$ are set in step (2), and the real-time timing variable t is initialized in step (2) as well, there is a step (6.1) executed between step (6) and step (7), which is, compare the number of distance virtual values included in the maximum length element association $D'_{max}$; and set minimum number of distance virtual values included in the maximum length element association of the second class receiving process E, if y<E, and the real-time timing variable t≧$T_n$, end current measurement and output an error indication. The minimum number of distance virtual values included in the maximum length element association of the second class receiving process E, the time limit of one measurement $T_n$ could be set through the ways of manual setting and automatic setting, wherein, the setting value of minimum number E is equal to or less than the number of groups emitted during one ranging process $G_D$. If the number of distance virtual values y included in the maximum length element association $D'_{max}$ is less than the set minimum number E, but measurement is overtime, the present measurement process is judged to end. Step (6.1) ensures the sample numbers of distance virtual values which are used for mean value smoothing process during second class receiving process, and the final ranging result is obtained based on curtain numbers of samples, which further ensures the accuracy as a following Step of Step (5) (which ensures the sample numbers of distance measured values of each laser pulse group).

Furthermore, or as the second preferable embodiment, a process is executed after at least one step of step (1) to step (7), which is, compare the real-timing variable t and set time limit of one measurement $T_n$, if t>$T_n$, the measurement is end and an overtime indication is output. For the purpose of preventing endless loop, a real-time timing variable t is further set, and the time limit of one measurement process is $T_n$. During the in-order execution from Step (1) to Step (7), the judgment of time-consuming is executed after each Step, if consumed time is more than preset time-limit, current measurement process should be end, and output an overtime indication, which helps operators find out system error as soon as possible and avoids spending time on unwitting wait, and increases the ranging efficiency as well. The time limit $T_n$ could be set through at least one way of manual setting and ex-factory setting.

As the third preferable embodiment, the receiving sensitivity of reflected signal adjustment comprises the steps of:

(1) Set pulse-width reference values of reflected laser pulse signal correspondence to each of the distance modes, $Q_1$~$Q_a$, wherein, the distance mode $A_i$ is corresponding to the pulse-width reference values of reflected laser pulse signal $Q_i$, i is a positive integer from 1 to a;

(2) Emit a laser pulse group, and then measure the pulse width WI(i) of reflected laser pulse signal, wherein, i is a positive integer from 1 to a;

(3) Compare the pulse width of reflected laser pulse signal WI(i) and the pulse-width reference value $Q_i$ of selected distance mode Ai, if WI(i)≦$Q_i$, the current sensitivity control parameter is fitness, end the sensitivity adjustment; if WI(i)>$Q_i$, the current sensitivity control parameter is unfitness, adjust the sensitivity control parameter, and return to execute Step (2) and Step (3).

There are many interference signals between the emissive source and the subject, such as solar ray, laser pulse signals reflected by interferential subjects and etc. If the interference signals are received and processed as distance measured values, the final ranging result would be influenced deeply. So a suitable receiving sensitivity should be choose under the premise of getting the distance mode of current measured subject, to shield the interference signals. Compare with manual setting way, the automatic sensitivity adjusting way is more accuracy. The manual setting way is based on the experience of operator, predicted value, or prior ranging data in a large part, which is a choice of sensitivity based on estimated values. But, the automatic sensitivity adjusting way finds out the distance interval the measured subject belongs to firstly, chooses a suitable distance mode, compare the pulse width of reflected laser pulse signal and the pulse-width reference value of selected distance mode and adjust the receiving sensitivity of laser pulse reflecting signals.

As the first preferable embodiment of the sensitivity adjustment step described above, in Step (2), the select of the distance mode and the measurement of the pulse width WI(i) both are based on one laser pulse group.

As the second preferable embodiment of the sensitivity adjustment step described above, in step (2), the select of the distance mode is base on a first laser pulse group, and the measurement of the pulse width WI(i) is base on a second laser pulse group emitted after the first laser pulse group.

The pulse width WI(i) of reflected signals could be acquired through two ways alternatively: the first way is computing the pulse width of emitting signals coupled with the process of distance mode selection; the second way is emitting another group of laser pulses for receiving sensitivity adjustment after the distance mode is determined. The first way is of lower power waste and higher efficiency, but the second way is of higher accuracy.

As the third preferable embodiment of the sensitivity adjustment step described above, the adjustment of sensitivity is made through adjusting the threshold voltage of a comparator. When the threshold voltage of comparator is lower, interference signals are easier to pass through the comparator and get into the subsequence circuit thereof; oppositely, if the threshold voltage of comparator is higher, interference signals are harder to pass through the comparator. When stronger shield capability to interference signals is needed, the threshold voltage of comparator should be increased to make the receiving end be with lower receiving sensitivity to reflected signals, which means, the threshold voltage of comparator and the receiving sensitivity are in inverse proportion, a lower threshold voltage of comparator is correspondence to a higher receiving sensitivity of reflected signals.

As the forth preferable embodiment, the maximum of absolute jitter difference between two consecutive distance measured values is set as $D_s$ in Step (2), Step (5.1) and Step (5.2) are executed between Step (5) and Step (6), which are, (5.1) compute the jitter difference between two adjacent measured distance values after sequencing, the measured distance values sequenced consecutively and whose absolute jitter difference are smaller than or equal to the maximum of absolute jitter difference $D_s$ are combined in one element association, and the element association with the maximum element quantity is set to be a maximum length element association $D''_{max}$, set the number of measured distance values included in the maximum length element association $D''_{max}$ is z;

(5.2) compare z and set minimum number of distance approximations include in each of the laser pulse groups D, if $z \geq D$, the laser pulse group including the maximum length element association $D''_{max}$ is effective, return to step (3) and process the measured distance values obtained by next group of laser pulses; if $z<D$, the laser pulse group including the maximum length element association $D''_{max}$ is noneffective, emit another group of laser pulses, and execute Step (4) to Step (5.2) on obtained $I_D$ measured distance values. A tiny shaking in ranging operating end might be magnified larger and larger in the measured subject end along with the increasing of ranging distance, which makes a large deviation between the distance measured value and the actual subject distance. The distance measured values with lager margin of variation as a result of shaking should be discarded in Step (5) in order to increase the accuracy of measurement. Besides, the jitter difference between two adjacent measured distance values after sequencing should be smaller than set numbers of elements, which ensures the subsequence steps are executed on the basis of a certain amount of distance measured values, and further increases the accuracy of measurement.

A method for selecting a distance mode in laser ranging, which comprises the steps of:

(1) Divide the extreme measure distance Ia into a distance intervals [0~I1], $(I_1 \sim I_2)$, ..., $(I_{a-1} \sim I_a)$, $I \in [0, a]$, each of the intervals is corresponding to one distance mode, which are $A_1 \sim A_a$, $a \geq 1$, the distance modes $A_1 \sim A_a$ are corresponding to a parameter configurations of ranging circuit;

(2) Set a laser pulse group with $I_D$ laser pulses, divide the $I_D$ laser pulses into a sub-groups, each of which includes $I_g$ ranging pulses, namely, $I_D = a \times I_g$;

(3) Select a distance mode which is correspondence to target distance interval, and then emit a sub-group of laser pulses to the interval; process the measured distance values reflected into the receiving circuit and got calculated distance values of the interval;

(4) Compare the calculated distance values with the upper distance limit and the lower distance limit of the interval, if the calculated distance values are greater than the lower distance limit, and smaller than the upper distance limit as well, the target is in the interval, and the distance mode that the interval is correspondence to is chosen to be current operating mode for the target; or not, the target is not in the interval, select another distance interval as target distance interval, return to execute step (3).

The distance between measured subject and ranging operation end (the emitting end of laser pulses) influences the ranging result to a certain extent. The uncontrollable factors laser pulses met during flight are increased along with the increasing distance between a measured subject and the ranging operation end. To determine the spatial position of measured subject and configure different ranging circuit parameters according to the distance interval the measured subject belongs to before the ranging steps are executed on measured subject can increase the accuracy of ranging steps executed subsequently.

As the first preferable embodiment, the extreme flying distance of each sub-group of laser pulses is the upper distance limit of the distance interval which is correspondence to the sub-group. Suppose that a measured subject is located at the largest distance position of one distance interval from the laser pulse emitting end. In order to make the laser pulse signals of emitted laser pulse group can cover a whole distance interval; the longest flight distance of laser pulses of a laser pulse group is set to be equal with the upper limit distance value of the distance interval corresponding to the laser pulse group. The parameters of laser pulse signals driving circuit are configured according to the aforementioned principle.

Furthermore, a levels of drive current are adopted when a sub-groups of laser pulses are emitting respectively, the drive current used for emitting laser pulses to the distance interval which is nearer to the emitting point is smaller than the drive current used for emitting laser pulses to the distance interval which is farther to the emitting point. The flight distance of laser pulse signals of each group is adjusted through adjusting the value of driving current. The drive current configured to laser pulse group with longer flight distance is larger than the drive current configured to laser pulse group with shorter flight distance.

As the second preferable embodiment, a time-control times is set corresponding to the distance intervals respectively; laser pulses reflected into the receiving circuit in the corresponding time-control time of current distance interval are shielded as noisy signal; reflected signals getting into the receiving circuit after corresponding time-control time of current distance interval are regard as effective measured distance values, and calculated distance values of current interval are gotten by processing the effective measured distance values. To avoid the reflection of laser pulses by other interferential subjects other than measured subject, and getting an error distance ranging value, time-control time is set.

Furthermore, the time-control time corresponding to a farther distance interval from the emitting point of laser pulses is longer than the time-control time corresponding to a nearer distance interval to the emitting point. The purpose of setting time-control time is to avoid the reflection of laser pulses by other interferential subjects located between measured subject and laser emitting end, and getting an error distance ranging value, so the duration of time-control time is adjusted according to the distance between a distance interval and laser pulse emitting point.

As the third preferable embodiment or a preferable embodiment of the first or the second embodiment, the parameters of ranging circuit at least include drive current for laser emitting, and the time-control time.

An apparatus for laser ranging, comprising:

a power supply, supplying power to the laser ranging apparatus;

a laser pulses emitting unit, emitting laser pulse signals, the emitted laser pulses get to a target through lens;

a laser pulses receiving unit, receiving signals getting into the laser ranging apparatus;

a receiving sensitivity adjusting unit, adjusting the receiving sensitivity of the laser pulse receiving unit, reflected laser pulses go through lens, the laser pulses receiving unit, and the receiving sensitivity adjusting unit connected with the laser pulses receiving unit in turn;

a time-interval measuring unit, controlling the time-sequence of emitting laser pulse, computing the time-interval between the laser pulse emitting and the receiving thereof, measuring the pulse-width of reflected laser pulse signals, the time-interval measuring unit is connected with the laser pulse emitting unit and the receiving sensitivity adjusting unit;

a micro-processor (MCU), connected with the time-interval measuring unit, the micro-processor (MCU) receives the information of emitting time-sequence, the time-interval of laser pulses, and the pulse-width of emitting signals, and moreover, chooses the distance modes, adjusts the receiving sensitivity, estimates the shaking-extent of measured distance values, and process the measured distance values of target to obtain ranging result according to received information and measured distance values.

As the first preferable embodiment, laser pulses emitting unit comprises, a laser emitter, generating laser pulse signals;

a switching circuit, connected with the laser emitter, when the switching circuit is on, the laser emitter emits laser pulses;

a driving circuit, connected with the switching circuit, the driving circuit drives the laser emitter to emit laser pulse signal by controlling the on and off of the switching circuit, the output current of the driving circuit is one of the diverse driving currents;

a sampling circuit of count start signal, getting the time message of the emitting instant of laser pulse, and outputting the time message to the time-interval measuring unit.

As the second preferable embodiment, laser pulses receiving unit comprises a photoelectric conversion element, which converts received laser signals to electrical signals; the receiving sensitivity adjusting unit comprises, an amplifying circuit, connected with the photoelectric conversion element, the amplifying circuit amplifies the electrical signals output from the photoelectric conversion element;

a comparator, connected with the amplifying circuit, the comparator converts the analog signals output from the amplifying circuit to digital signals, and outputs the digital signals to the time interval measuring unit;

a D-A converter, converting the digital control signals output from the time interval measuring unit to analog signals, and outputting which to the comparator;

the time interval measuring unit computes the pulse-width values of the digital signals output from the comparator, and outputs an adjustment signal to the D-A converter according to the result thereof; the comparator adjusts the threshold voltage according to the adjustment signal.

As the third preferable embodiment, time interval measuring unit comprises, a clock generator, generating clock signal;

a timing and processing module, comprising, a logic control unit, connected with the micro-processor (MCU) and the laser pulse emitting unit, the input end of the logic control unit receives the time message of the emitting instant of laser pulses;

a counter, controlled by the logic control unit to count the clock signal, the input end of the counter for inputting counting signals is connected with the clock generator, and the counting control end thereof is connected with the logic control unit;

a flip-latch, latching the count value of the counter, the flip-latch is connected with the micro-processor (MCU) through a paralleled to serial interface, and transmits the count value to the micro-processor (MCU) through the paralleled to serial interface, the micro-processor (MCU) computes to obtain distance value according to the count value;

the logic control unit controls the start-stop time of latching the emitted laser pulses of flip-latch according to the input time message of the emitting instance of laser pulses and the receiving time thereof.

The advantages of present invention are described as follows:

The accuracy of ranging is increased through multi classes of receiving process;

The accuracy of ranging is further increased through the selection of distance mode and the adjustment of receiving sensitivity before the measuring steps are executed;

The accuracy of ranging is further increased through executing jitter judgment on obtained distance measured values to discard the distance measured values that do not satisfy the setting conditions and judge whether the number of remaining distance measured values satisfies the setting quantity requirement;

The present invention is also of simple structure, high measurement efficiency, and low power waste.

BRIEF DESCRIPTION OF THE DRAWINGS

FIG. 5 is separated into FIGS. 5a and 5b;

FIG. 9 is separated into FIG. 9a and 9b.

DESCRIPTION OF THE PREFERRED EMBODIMENT

Figure 1:
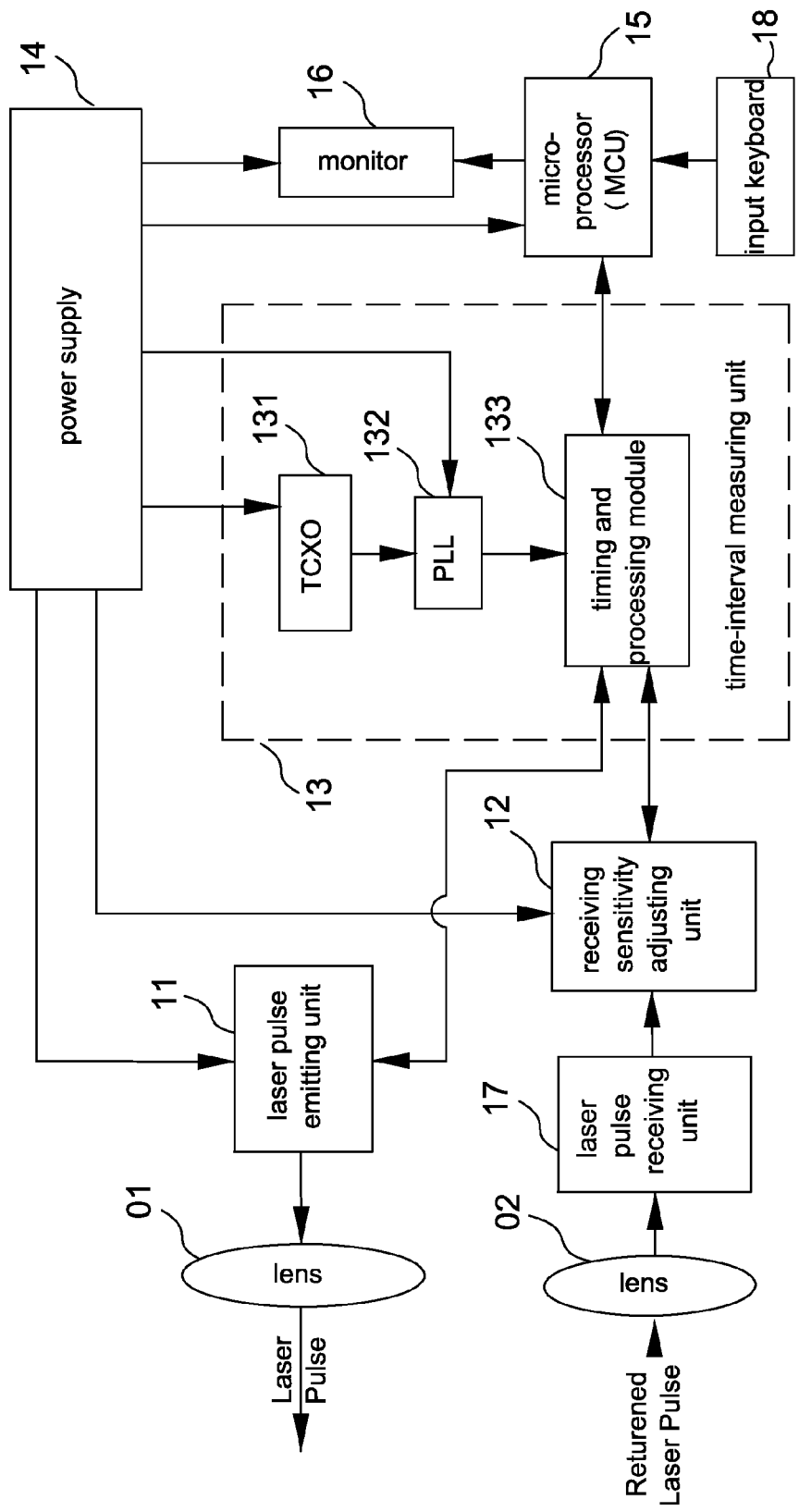
FIG. 1 is a block diagram of the present invention.
Figure 2:
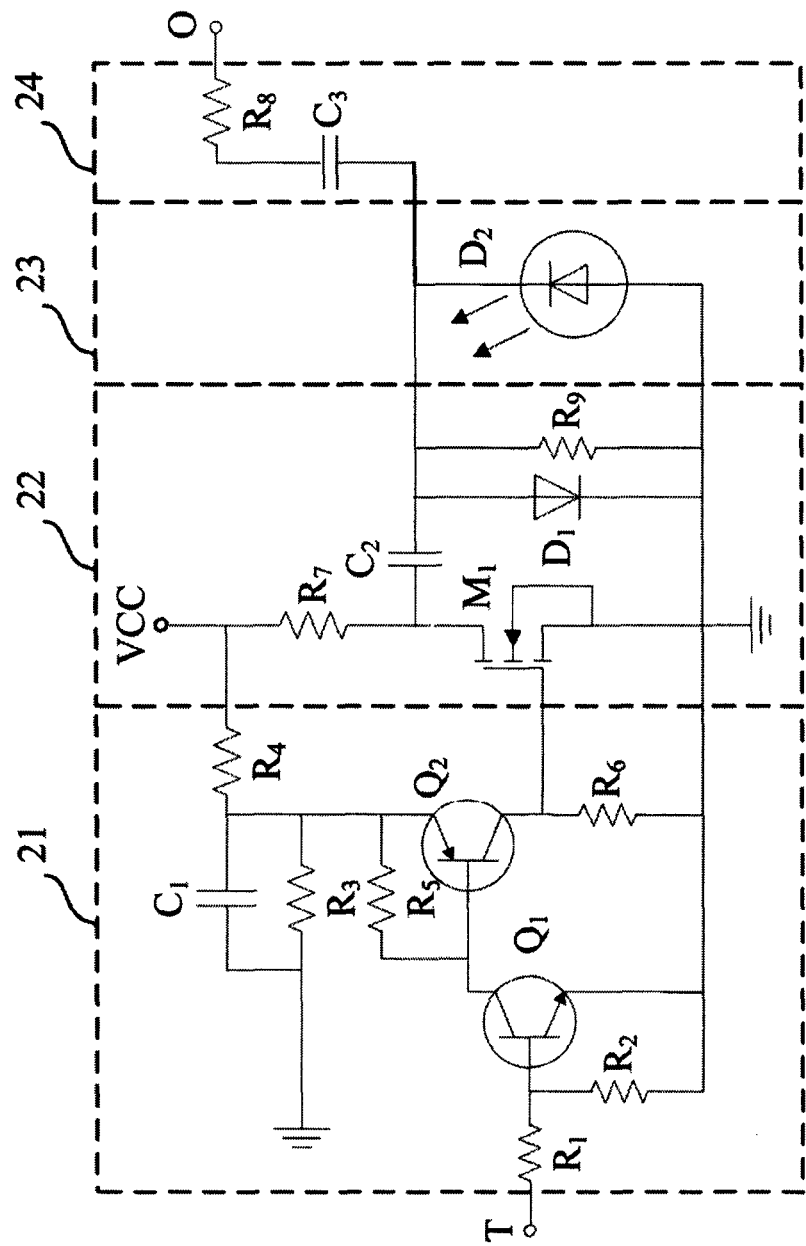
FIG. 2 is a circuit diagram of the laser pulse emitting unit according to the present invention.
Figure 3:
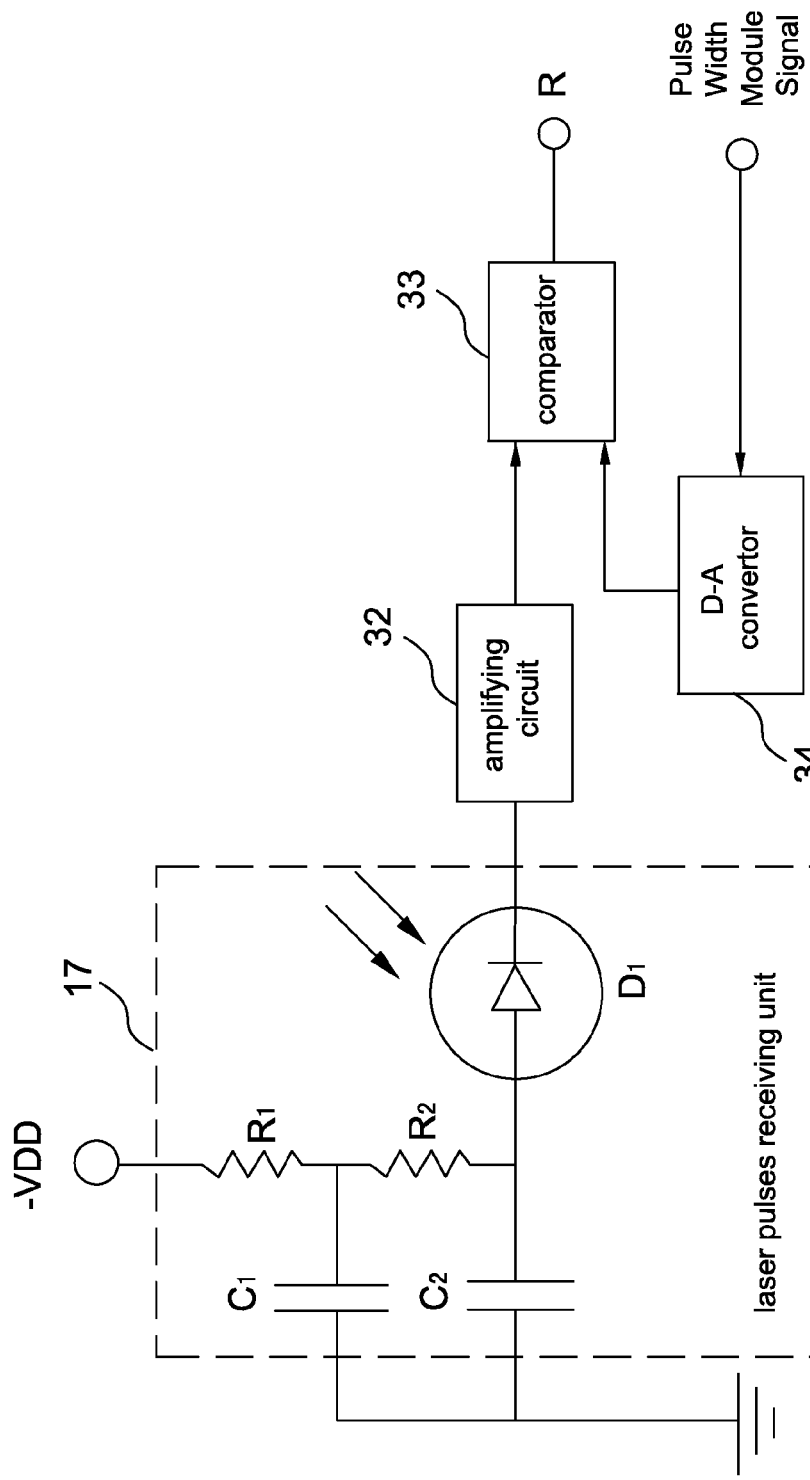
FIG. 3 is a block diagram of the receiving sensitivity adjusting unit according to the present invention.
Figure 4:
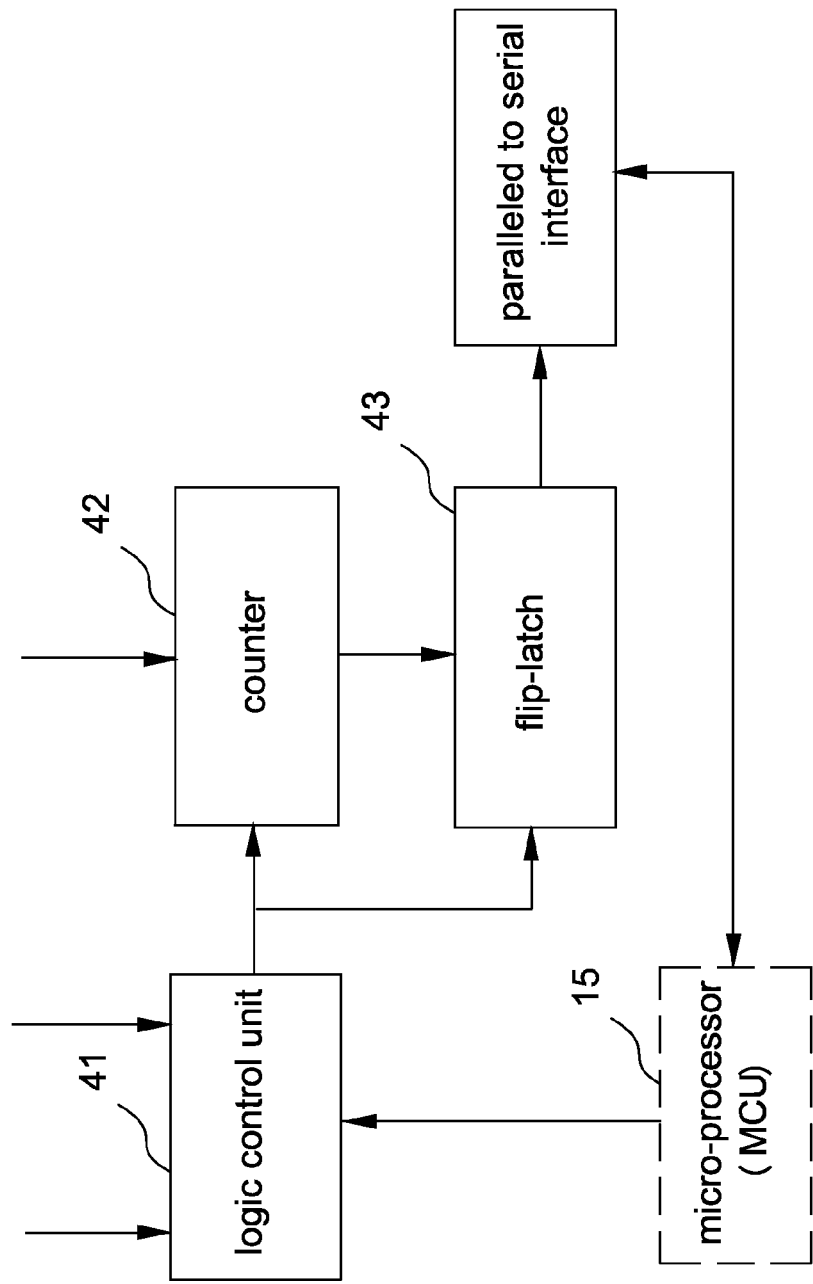
FIG. 4 is a block diagram of the timing and processing module according to the present invention.
Figure 5A:
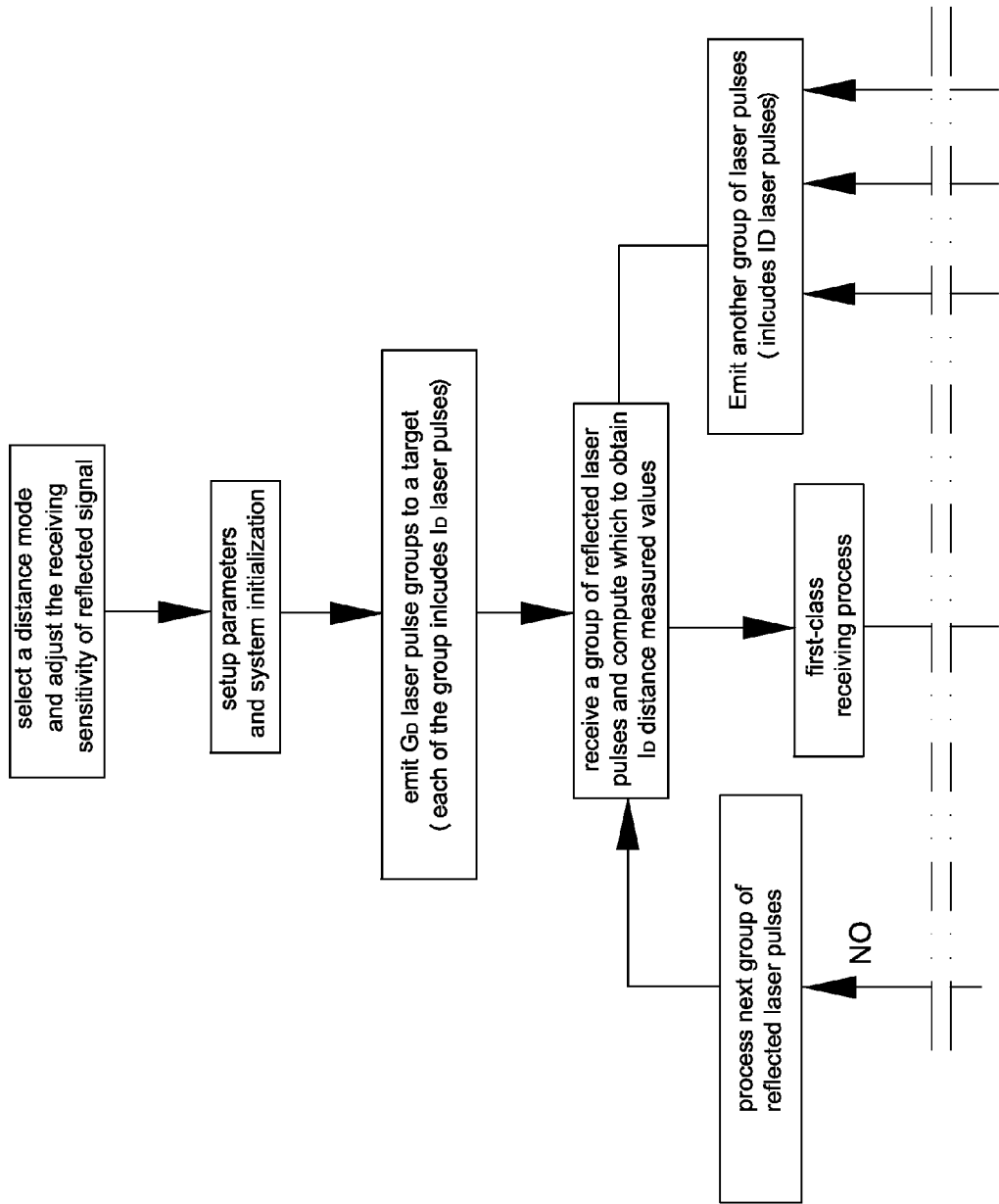
FIG. 5 is an operation flow diagram of the laser ranging method according to the laser ranging method of present invention.
Figure 5B:
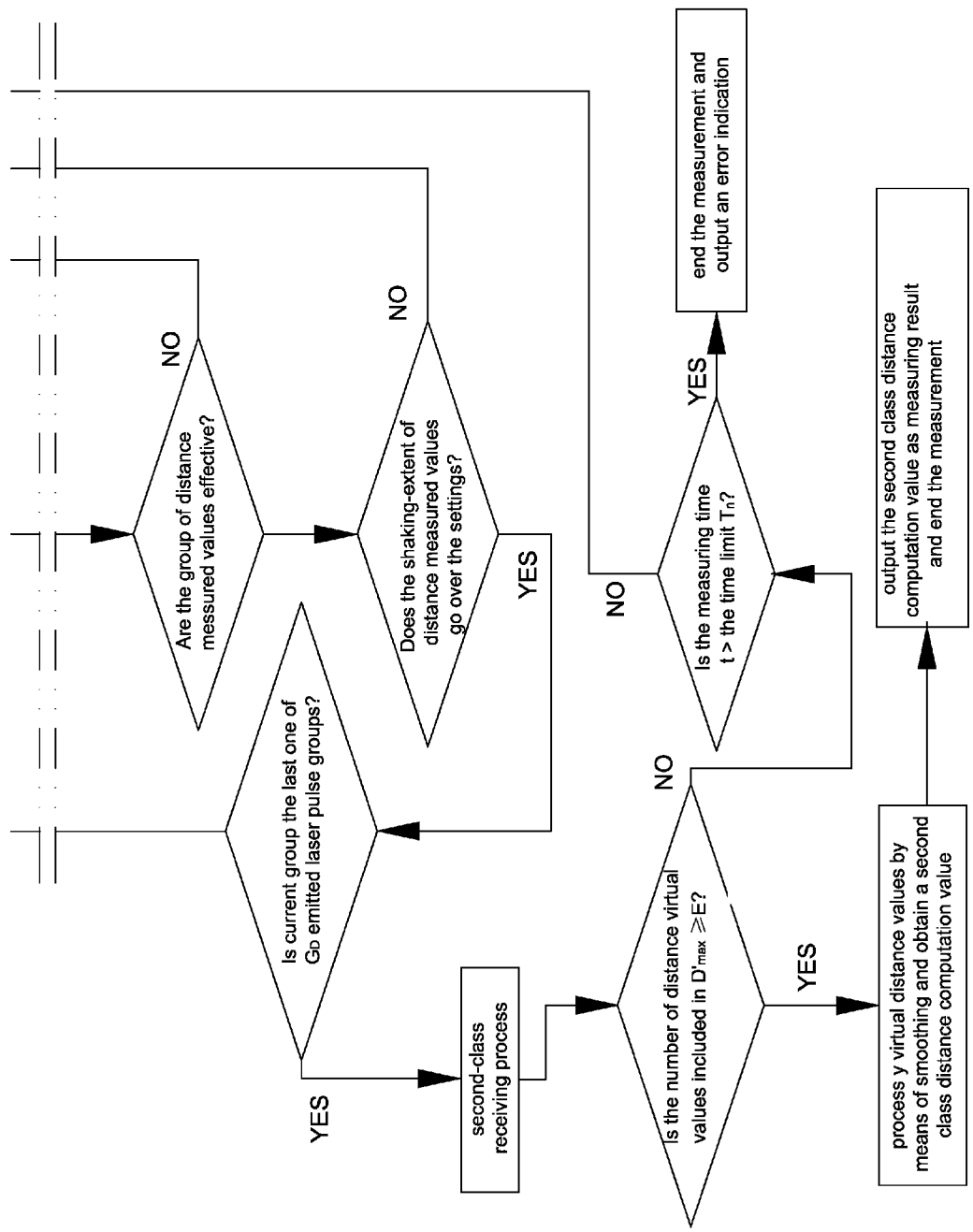
Figure 6:
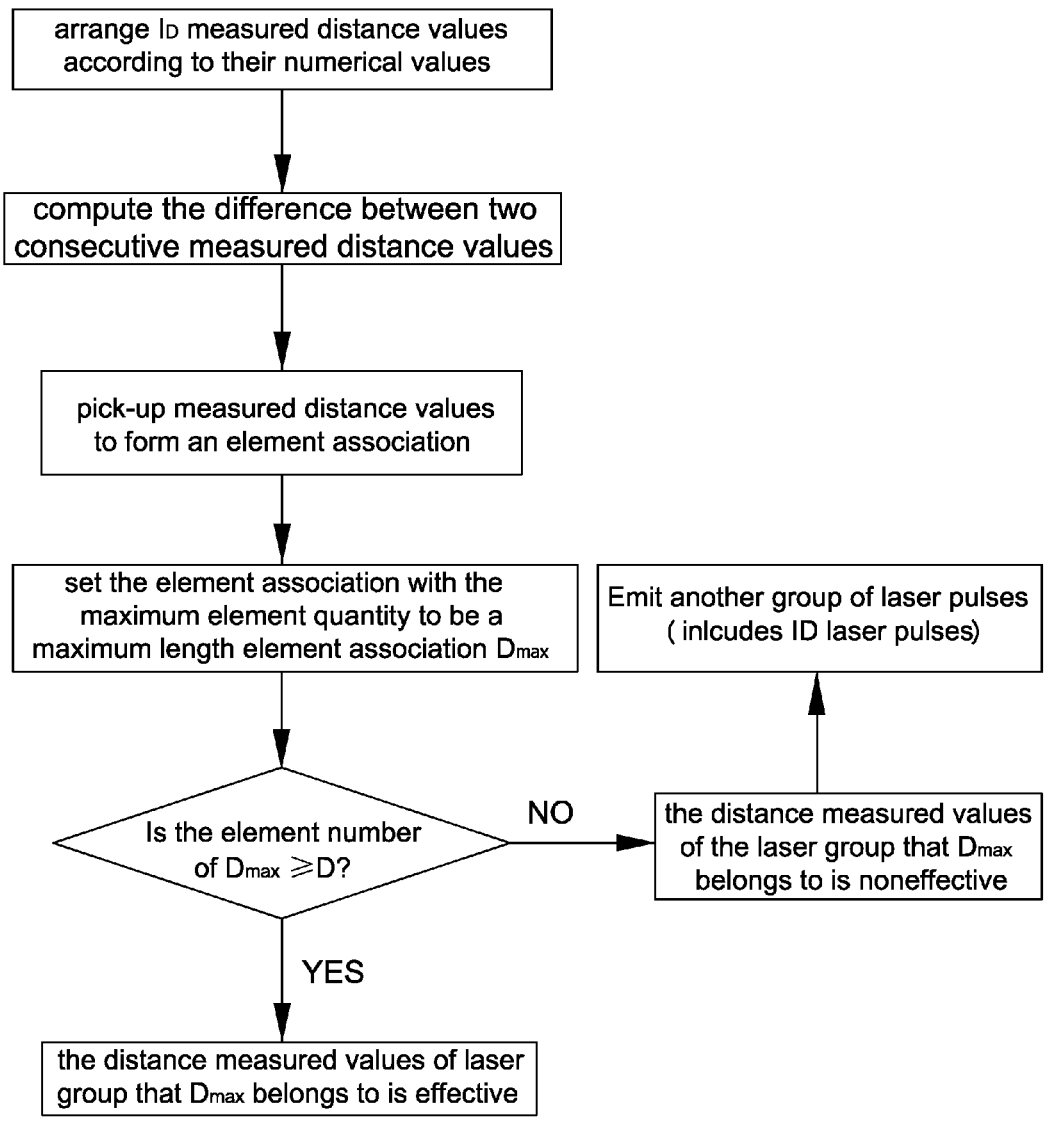
FIG. 6 is an operation flow diagram of the first class receiving process and the validity determinant process of distance values of the laser ranging method shown in FIG. 5.
Figure 7:
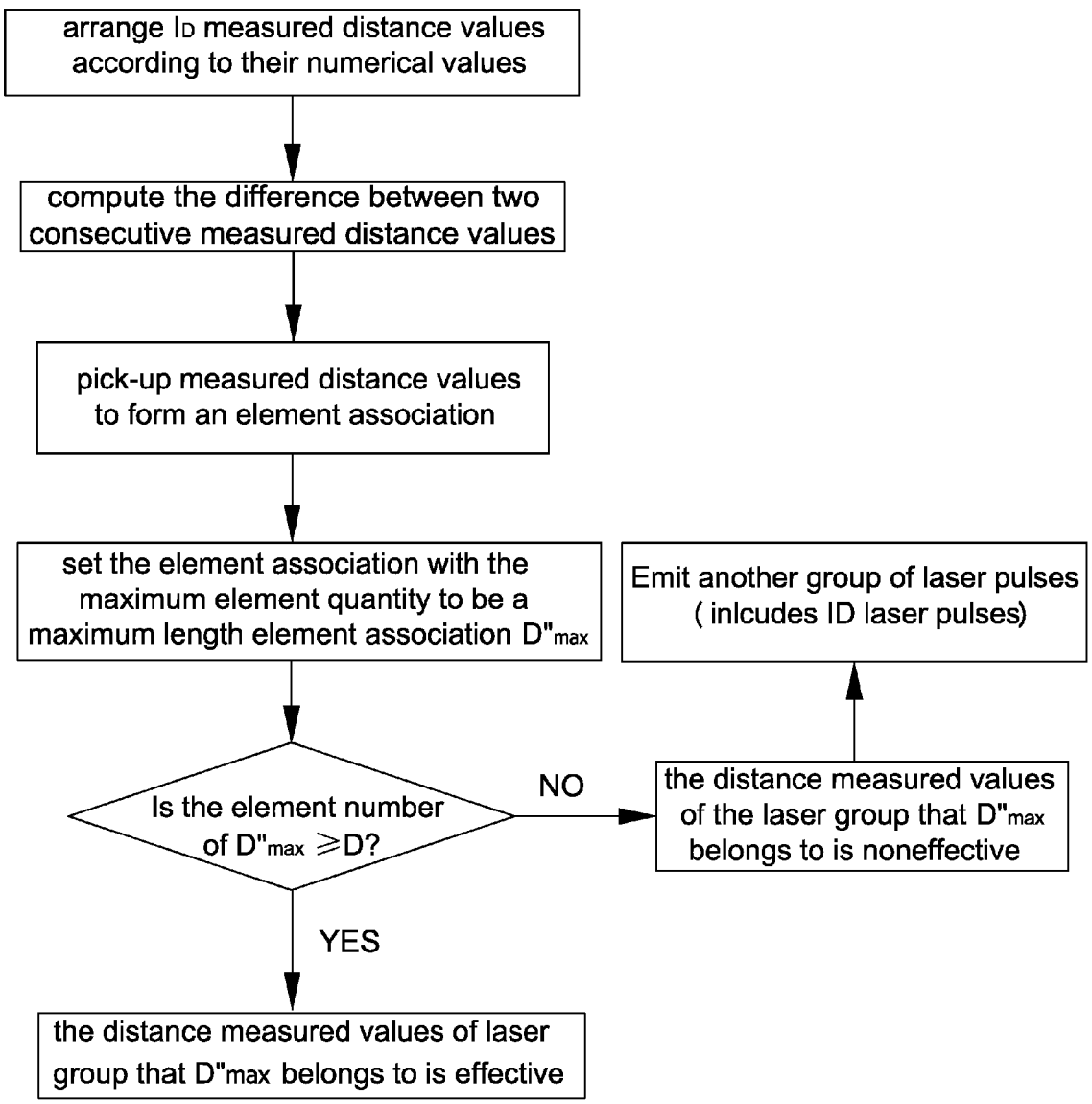
FIG. 7 is an operation flow diagram the shaking-extent estimation process of the laser ranging method shown in FIG. 5.
Figure 8:
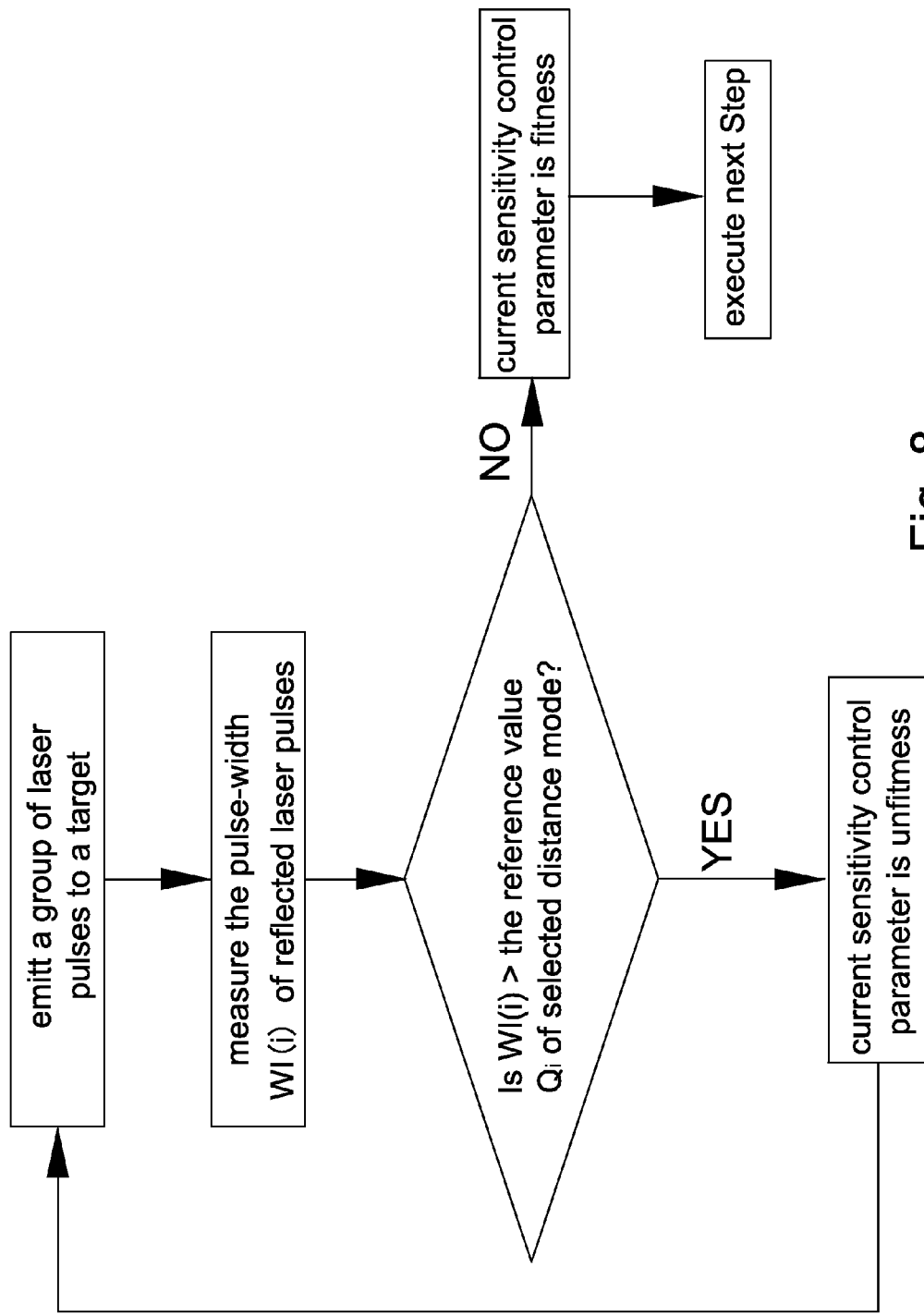
FIG. 8 is an operation flow diagram of the receiving sensitivity adjustment process of the laser ranging method shown in FIG. 5.
Figure 9A:
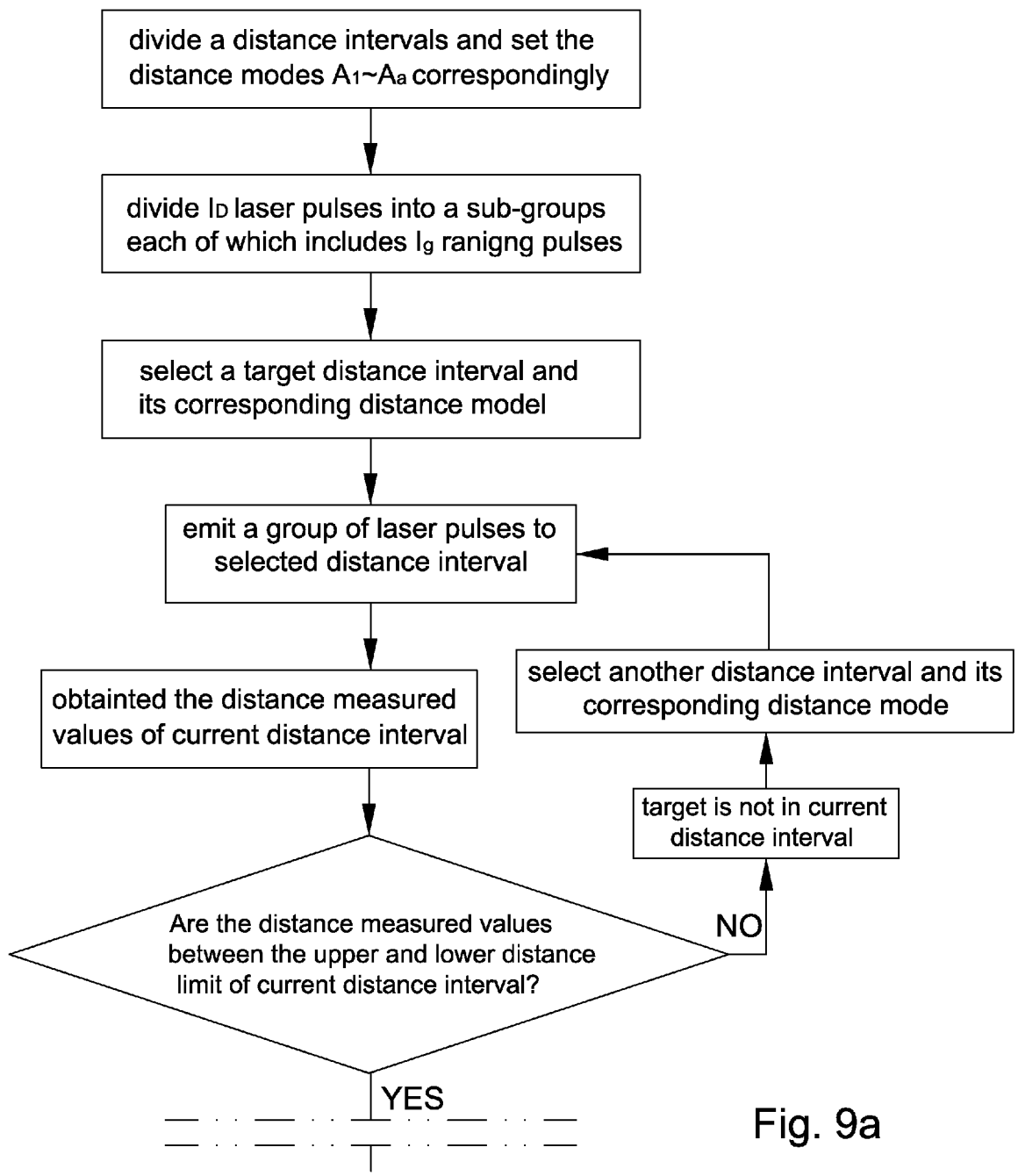
FIG. 9 is an operation flow diagram of the distance mode selection method according to the present invention.
Figure 9B:
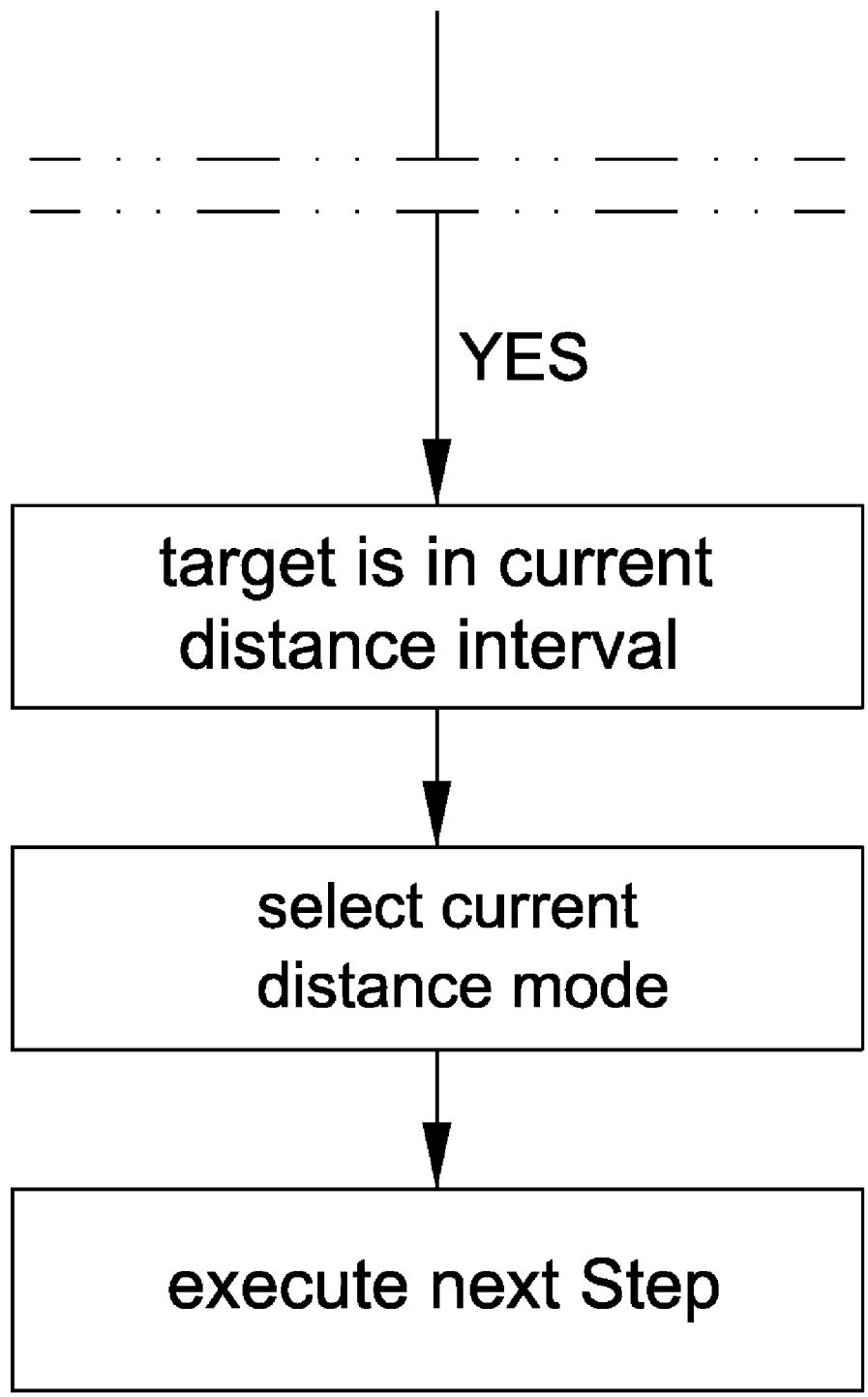

Through the embodiments described subsequently and the drawings combined with, the technique detailed of the present invention could be fully understood.

A method for laser ranging, which comprises the steps of:

(1) Select a distance mode and then adjust the receiving sensitivity of reflected signal according to selected distance mode;

(2) Set the number of laser pulse groups emitted during a measurement process as $G_D$, the number of laser pulses included in one laser pulse group as $I_D$, the maximum of absolute difference between two measured distance values arranged consecutively in first class receiving process as $D_A$, the maximum of absolute difference between two virtual distance values sequenced consecutively in second class receiving process as $D_B$, the minimum number of distance values included in an element association with maximum length gotten from each laser pulse group in the first class receiving process as D, the maximum of absolute jitter difference between two consecutive distance measured values as $D_s$;

(3) Emit $G_D$ laser pulse groups to a target in a way of time diversity, each of the laser pulse group includes $I_D$ ranging pulses with the same period, the ranging pulses reflect by the target and receive by a receiving circuit, $I_D$ measured distance values correspondence to each of the ranging pulses are obtained after computing, and then execute Step (4) and Step (5) in turn on each laser pulse group;

(4) First-class receiving process: arrange the $I_D$ measured distance values according to their numerical value thereof; compute the difference between two consecutive measured distance values; the measured distance values sequenced consecutively and whose absolute difference values are smaller than or equal to the maximum absolute difference value $D_A$ are combined in one element association, and the element association with the maximum element quantity is set to be a maximum length element association Dmax of current group;

(5) Set the number of measured distance values included in the maximum length element association $D_{max}$ as x; compare x and set minimum number of distance values included in an element association with maximum length gotten from one laser pulse group D, if x≧D, the laser pulse group that the maximum length element association $D_{max}$ belongs to is effective; process the x measured distance values by means of mean smoothing, and then obtain a first-class distance computation value; save the first-class distance computation value as a virtual distance value; if x<D, the laser pulse group that the maximum length element association $D_{max}$ belongs to is noneffective, emit another group of laser pulses, and execute Step (4) and Step (5) in order to obtained $I_D$ measured distance values;

(5.1) compute the jitter difference between two adjacent measured distance values after sequencing, the measured distance values sequenced consecutively and whose absolute jitter difference are smaller than or equal to the maximum of absolute jitter difference Ds are combined in one element association, and the element association with the maximum element quantity is set to be a maximum length element association $D''_{max}$, set the number of measured distance values included in the maximum length element association $D''_{max}$ is z;

(5.2) compare z and set minimum number of distance approximations include in each of the laser pulse groups D, if z≧D, the laser pulse group including the maximum length element association $D''_{max}$ is effective, return to step (3) and process the measured distance values obtained by next group of laser pulses; if z<D, the laser pulse group including the maximum length element association $D''_{max}$ is noneffective, emit another group of laser pulses, and execute Step (4) on obtained ID measured distance values;

(5.3) return to Step (3) to process the measured distance values obtained from the next group of laser pulses; if the laser pulse group processed in this step is the last group of laser pulses, execute the subsequent steps;

(6) Second class receiving process: arrange saved virtual distance values according to the numerical value thereof; compute the difference between two consecutive virtual distance values; the virtual distance values sequenced consecutively and whose absolute difference values are smaller than or equal to the maximum absolute difference value $D_B$ are combined in one element association, and the element association with the maximum element quantity is set to be a maximum length element association for second class receiving processing $D'_{max}$; the number of virtual distance values included in the maximum length element association $D'_{max}$; is set as y;

(6.1) compare the number of distance virtual values included in the maximum length element association $D'_{max}$; and set minimum number of distance virtual values included in the maximum length element association of the second class receiving process E, if y<E, and the real-time timing variable t≧$T_n$, end current measurement and output an error indication; or not, emit another group of laser pulses, and go back to execute Step (4) to the gotten $I_D$ measured distance values;

(7) Process the y virtual distance values by means of smoothing, and obtain a second class distance computation value, output the second class distance computation value as the result of current measurement process; end the measurement.

The final measurement result is obtained by emitting multi groups of laser pulses, calculating and adjusting to get virtual first class distance measured value of each groups of laser pulses, and executing the second receiving process on multi first class distance measured values. When the first class distance computation value is determined to be noneffective for each group of laser pulses emitting in Step (3), another group of laser pulses will be emit; as a substitution, execute Step (4) to Step (5) to ID distance measured values gotten from the re-emitted laser pulse group till a virtual first class computation value is gotten; and then, go back to process distance measured values gotten from the next group of laser pulses; if the process aforementioned is the executed on the last emitting group of laser pulses of Step (3), go to subsequent steps. The execution of Step (5) ensures the number of samples of distance measured values gotten from each group of laser pulses; the first class distance computation value obtained on the basis of a certain amount of distance measured values is more accurate. The second class receiving process executed after Step (5) is a farther process on multi virtual distance values gotten from the first class receiving process to increase the accuracy of measurement to a higher level. Likewise, more classes of receiving process could be set; and the selection of element association with maximum length and mean value processing would be executed on each class of receiving process to increase the accuracy of measurement. If producers want to further ensure the accuracy of gotten distance value, a third class receiving process or more subsequence receiving processes could be executed. Take third class receiving process for example, a third class distance computation value is obtained through executing Step (3) to Step (7) repeatedly, and executing the selection of element association with maximum length and mean value processing described in Step (6) to Step (7) on multi second class distance computation values repeatedly. More classes of receiving process can be concluded by the skilled in the art, and there is no more detailed description.

In this embodiment, the selection of distance mode and the adjustment of receiving sensitivity of reflected signal could be carried out by manual and automatic setting alternatively. If the way of manual setting is adopted, operator chooses a suitable distance mode and receiving sensitivity of reflected signals according to actual situation through visual range estimation and some predictable information combined with. If the way of automatic settings is adopted, system decides a distance mode and sensitivity of reflected signals intelligently in Step (1) according to the actual situation of a subject, such as the distance between the laser pulse emitting point and the subject and the pulse width of laser pulse reflecting signals, through loading a distance mode selection program and a sensitivity adjustment program in which. Likewise, the parameters setting could also be carried out by manual and automatic ways alternatively in Step (2). If the manual way is adopted, operator could choose suitable parameters according to expected ranging accuracy, for example, if you want to achieve a high measurement accuracy, you could increase at least one parameter of the number of laser pulse groups emitted during one measuring process $G_D$ and the number of laser pulses included in one group of laser pulses $I_D$ and decrease at least one of the maximum of absolute difference between two measured distance values arranged consecutively in first class receiving process as $D_A$ and the maximum of absolute difference between two virtual distance values sequenced consecutively in second class receiving process as $D_B$, or increase the minimum number of distance values included in an element association with maximum length gotten from each laser pulse group in the first class receiving process as D, the parameters aforementioned could be preset as fixed values before the apparatus leave factory.

The minimum number of distance virtual values included in the maximum length element association of the second class receiving process E, the time limit of one measurement $T_n$ could be set through the ways of manual setting and automatic setting, wherein, the setting value of minimum number E is equal to or less than the number of groups emitted during one ranging process $G_D$. If the number of distance virtual values y included in the maximum length element association $D'_{max}$ is less than the set minimum number E, but measurement is overtime, the present measurement process is judged to end. Step (6.1) ensures the sample numbers of distance virtual values which are used for mean value smoothing process during second class receiving process, and the final ranging result is obtained based on curtain numbers of samples, which further ensures the accuracy as a following Step of Step (5) (which ensures the sample numbers of distance measured values of each laser pulse group). Such kind of judgment process could also be added in Step (6.1), which is if y<E and t<$T_n$, emit another group of laser pulses, and execute Step (4) to Step (5) on received $I_D$ distance measured values, and then execute Step (6) to Step (7) on distance virtual values, which means that a new group of laser pulses could be emitted as long as the measurement is not overtime, Step (7) would not be executed until the limit setting y≧E is satisfied.

Optionally, a process is executed after at least one step of Step (1)~Step (7), which is, compare the real-timing variable t and set time limit of one measurement $T_n$, if t>$T_n$, the measurement is end and an overtime indication is output. For the purpose of preventing endless loop, a real-time timing variable t is further set, and the time limit of one measurement process is $T_n$. During the in-order execution from Step (1) to Step (7), the judgment of time-consuming is executed after each Step, if consumed time is more than preset time-limit, current measurement process should be end, and output an overtime indication, which helps operators find out system error as soon as possible and avoids spending time on unwitting wait, and increases the ranging efficiency as well. The time limit $T_n$ could be set through at least one way of manual setting and ex-factory setting.

A tiny shaking in ranging operating end might be magnified larger and larger in the measured subject end along with the increasing of ranging distance, which makes a large deviation between the distance measured value and the actual subject distance. The distance measured values with lager margin of variation as a result of shaking should be discarded in Step (5) in order to increase the accuracy of measurement. Besides, the jitter difference between two adjacent measured distance values after sequencing should be smaller than set numbers of elements, which ensures the subsequence steps are executed on the basis of a certain amount of distance measured values, and further increases the accuracy of measurement. In Step (2), the minimum number of distance values D might be set in the way of manual setting or system presetting.

Step (5.1) and Step (5.2) could also be executed on the maximum length element association $D_{max}$ after validity determinant of Step (5), which means to sequence the distance measured values in the maximum length element association $D_{max}$ in value order, compute the jitter difference between two adjacent measured distance values after sequencing, choose a maximum length element association $D''_{max}$, and compare the number of measured distance values included in the maximum length element association $D''_{max}$ z and set minimum number of distance approximations include in each of the laser pulse groups D, and at last, judge the validity of laser pulse group which the maximum length element association $D_{max}$ corresponds to. Step (4) to Step (5) and Step (5.1) to Step (5.2) could be executed synchronously, and choose the first obtained result of this two synchronous execution processes as a final result.

A ranging quality factor $Q_m$, a shaking factor S, and a ranging resolution ratio $R_1$ are set, according to empirical formulas, the maximum of absolute jitter difference $D_S = S \times Q_m \times R_1$.

The receiving sensitivity of reflected signal adjustment comprises the steps of:

(1) Set pulse-width reference values of reflected laser pulse signal correspondence to each of the distance modes, $Q_1 \sim Q_a$, wherein, the distance mode $A_i$ is corresponding to the pulse-width reference values of reflected laser pulse signal $Q_i$, i is a positive integer from 1 to a;

(2) Emit a laser pulse group, and then measure the pulse width WI(i) of reflected laser pulse signal, wherein, i is a positive integer from 1 to a;

(3) Compare the pulse width of reflected laser pulse signal WI(i) and the pulse-width reference value $Q_i$ of selected distance mode Ai, if WI(i)≦$Q_i$, the current sensitivity control parameter is fitness, end the sensitivity adjustment; if WI(i)>$Q_i$, the current sensitivity control parameter is unfitness, adjust the sensitivity control parameter, and return to execute Step (2) and Step (3).

In Step (2), the pulse width WI(i) of reflected signals could be measured through the ways mentioned below alternatively: 1. the select of the distance mode and the measurement of the pulse width WI(i) both are based on one laser pulse group; 2. the select of the distance mode is base on a first laser pulse group, and the measurement of the pulse width WI(i) is base on a second laser pulse group emitted after the first laser pulse group. The first way is of lower power waste and higher efficiency, but the second way is of higher accuracy.

The adjustment of sensitivity is made through adjusting the threshold voltage of a comparator. When the threshold voltage of comparator is lower, interference signals are easier to pass through the comparator and get into the subsequence circuit thereof; oppositely, if the threshold voltage of comparator is higher, interference signals are harder to pass through the comparator. When stronger shield capability to interference signals is needed, the threshold voltage of comparator should be increased to make the receiving end be with lower receiving sensitivity to reflected signals, which means, the threshold voltage of comparator and the receiving sensitivity are in inverse proportion, a lower threshold voltage of comparator is correspondence to a higher receiving sensitivity of reflected signals.

There are many interference signals between the emissive source and the subject, such as solar ray, laser pulse signals reflected by interferential subjects and etc. If the interference signals are received and processed as distance measured values, the final ranging result would be influenced deeply. So a suitable receiving sensitivity should be choose under the premise of getting the distance mode of current measured subject, to shield the interference signals. Compare with manual setting way, the automatic sensitivity adjusting way is more accuracy. The manual setting way is based on the experience of operator, predicted value, or prior ranging data in a large part, which is a choice of sensitivity based on estimated values. But, the automatic sensitivity adjusting way finds out the distance interval the measured subject belongs to firstly, chooses a suitable distance mode, compare the pulse width of reflected laser pulse signal and the pulse-width reference value of selected distance mode and adjust the receiving sensitivity of laser pulse reflecting signals.

A method for selecting a distance mode in laser ranging, which comprises the steps of:

(1) Divide the extreme measure distance Ia into a distance intervals $[0 \sim I1]$, $(I_1 \sim I_2)$, ..., $(I_{a-1} \sim I_a)$, $I \in [0, a]$, each of the intervals is corresponding to one distance mode, which are $A_1 \sim A_a$, $a \geq 1$, the distance modes $A1 \sim Aa$ are corresponding to a parameter configurations of ranging circuit, the parameters of ranging circuit at least include drive current for laser emitting, and the time-control time.

(2) Set a laser pulse group with $I_D$ laser pulses, divide the $I_D$ laser pulses into a sub-groups, each of which includes $I_g$ ranging pulses, namely, $I_D = a \times I_g$;

(3) Select a distance mode which is correspondence to target distance interval, and then emit a sub-group of laser pulses to the interval; process the measured distance values reflected into the receiving circuit and got calculated distance values of the interval;

(4) Compare the calculated distance values with the upper distance limit and the lower distance limit of the interval, if the calculated distance values are greater than the lower distance limit, and smaller than the upper distance limit as well, the target is in the interval, and the distance mode that the interval is correspondence to is chosen to be current operating mode for the target; save current ranging current parameter configuration and continue to execute subsequence ranging steps on current subject; or not, the target is not in the interval, select another distance interval as target distance interval, return to execute step (3).

The extreme flying distance of each sub-group of laser pulses is the upper distance limit of the distance interval which is correspondence to the sub-group. A levels of drive current are adopted when a sub-groups of laser pulses are emitting respectively, the drive current used for emitting laser pulses to the distance interval which is nearer to the emitting point is smaller than the drive current used for emitting laser pulses to the distance interval which is farther to the emitting point.

A time-control times is set corresponding to the distance intervals respectively; laser pulses reflected into the receiving circuit in the corresponding time-control time of current distance interval are shielded as noisy signal; reflected signals getting into the receiving circuit after corresponding time-control time of current distance interval are regard as effective measured distance values, and calculated distance values of current interval are gotten by processing the effective measured distance values. The time-control time corresponding to a farther distance interval from the emitting point of laser pulses is longer than the time-control time corresponding to a nearer distance interval to the emitting point.

The distance between measured subject and ranging operation end (the emitting end of laser pulses) influences the ranging result to a certain extent. The uncontrollable factors laser pulses met during flight are increased along with the increasing distance between a measured subject and the ranging operation end. To determine the spatial position of measured subject and configure different ranging circuit parameters according to the distance interval the measured subject belongs to before the ranging steps are executed on measured subject can increase the accuracy of ranging steps executed subsequently.

Suppose that a measured subject is located at the largest distance position of one distance interval from the laser pulse emitting end. In order to make the laser pulse signals of emitted laser pulse group can cover a whole distance interval; the longest flight distance of laser pulses of a laser pulse group is set to be equal with the upper limit distance value of the distance interval corresponding to the laser pulse group. The parameters of laser pulse signals driving circuit are configured according to the aforementioned principle; the flight distance of laser pulse signals of each group is adjusted through adjusting the value of driving current. The drive current configured to laser pulse group with longer flight distance is larger than the drive current configured to laser pulse group with shorter flight distance.

To avoid the reflection of laser pulses by other interferential subjects other than measured subject, and getting an error distance ranging value, time-control time is set. In present embodiment, the purpose of setting time-control time is to avoid the reflection of laser pulses by other interferential subjects located between measured subject and laser emitting end, and getting an error distance ranging value, so the duration of time-control time is adjusted according to the distance between a distance interval and laser pulse emitting point. Concretely, compute the time from emitting a laser pulse to the lower limit value of a distance interval to return to the receiving circuit according to the flight speed of laser pulse, and shield the reflected laser pulse signals under the computed time. In actual measurement process, the time-control time gotten through aforementioned computing method could be decreased or increased.

An apparatus for laser ranging, comprising:

a power supply 14, supplying power to the laser ranging apparatus;

a laser pulses emitting unit 11, emitting laser pulse signals, the emitted laser pulses get to a target through lens 01;

a laser pulses receiving unit 17, receiving signals getting into the laser ranging apparatus;

a receiving sensitivity adjusting unit 12, adjusting the receiving sensitivity of the laser pulse receiving unit 17, reflected laser pulses go through lens 02, the laser pulses receiving unit 17, and the receiving sensitivity adjusting unit 12 connected with the laser pulses receiving unit in turn;

a time-interval measuring unit 13, controlling the time-sequence of emitting laser pulse, computing the time-interval between the laser pulse emitting and the receiving thereof, measuring the pulse-width of reflected laser pulse signals, the time-interval measuring unit 13 is connected with the laser pulse emitting unit 11, the receiving sensitivity adjusting unit 12, and MCU 15;

a micro-processor (MCU) 15, connected with the time-interval measuring unit 13, the micro-processor (MCU) 15 receives the information of emitting time-sequence, the time-interval of laser pulses, and the pulse-width of emitting signals, and moreover, chooses the distance modes, adjusts the receiving sensitivity, estimates the shaking-extent of measured distance values, and process the measured distance values of target to obtain ranging result according to received information and measured distance values;

a monitor 16, controlled by the MCU 15, and displays ranging result and error information;

an input keyboard 18, inputs external control information to the MCU 15.

The laser pulses emitting unit 11 comprises, a laser emitter 23, generating laser pulse signals; a switching circuit 22, connected with the laser emitter 23, when the switching circuit is on, the laser emitter 23 emits laser pulses; a driving circuit 21, connected with the switching circuit, the driving circuit drives the laser emitter to emit laser pulse signal by controlling the on and off of the switching circuit, the output current of the driving circuit is one of the diverse driving currents; a sampling circuit of count start signal 24, getting the time message of the emitting instant of laser pulse, and outputting the time message to the time-interval measuring unit.

The laser pulses receiving unit comprises a photoelectric conversion element $D_1$, which converts received laser signals to electrical signals.

The receiving sensitivity adjusting unit 12 comprises, an amplifying circuit 32, connected with the photoelectric conversion element $D_1$, the amplifying circuit amplifies the electrical signals output from the photoelectric conversion element; a comparator 33, connected with the amplifying circuit 32, the comparator 33 converts the analog signals output from the amplifying circuit 32 to digital signals, and outputs the digital signals to the time interval measuring unit 13; a D-A converter 34, converting the digital control signals output from the time interval measuring unit 13 to analog signals, and outputting which to the comparator 33; the time interval measuring unit 13 computes the pulse-width values of the digital signals output from the comparator 33, and outputs a adjustment signal to the D-A converter 34 according to the result thereof; the comparator 33 adjusts the threshold voltage according to the adjustment signal.

The time interval measuring unit 13 comprises a clock generator, a timing-and-processing module 133, furthermore:

The clock generator generates clock signal, and comprises TCXO (Temperature-compensation Crystal Oscillator) 131 and PLL (phase-locked loop) 132, the TCXO 131 generates clock signals after frequency doubling by PLL 132;

The timing and processing module 133, comprising, a logic control unit 41, connected with the micro-processor (MCU) 15 and the laser pulse emitting unit 11, the input end of the logic control unit receives the time message of the emitting instant of laser pulses; a counter 42, controlled by the logic control unit 41 to count the clock signal, the input end of the counter 42 for inputting counting signals is connected with the clock generator, and the counting control end thereof is connected with the logic control unit 41; a flip-latch 43, latching the count value of the counter, the flip-latch is connected with the micro-processor (MCU) 15 through a paralleled to serial interface, and transmits the count value to the micro-processor (MCU) through the paralleled to serial interface 44, the micro-processor (MCU) 15 computes to obtain distance value according to the count value; the logic control unit 41 starts the counter 42 according to the timing information of the emitting moment of laser pulses, and controls the flip-latch 43 save the count value of counter 42 according to the receiving moment of laser pulses.

Combine with the laser ranging apparatus and the method described above; the present invention will be further described as followed:

Turn on the source to actuate the apparatus, input each ranging parameters, such as the number of laser pulse groups emitted during a measurement process as $G_D$, the number of laser pulses included in one laser pulse group as $I_D$ and so on by input keyboard 18, each of the parameters mentioned above might be set through different ways, such as system presetting, manual selection, presetting in factory, and input values manually with the instruction of system, the parameter setting modulation is selected according to actual need, and there is not going to give more examples; MCU 15 records each of set ranging parameters;

Firstly, the distance mode choice step is executed; the driving circuit is controlled to output corresponding driving current according to the distance interval which the current emitting laser pulse group corresponding to, the laser emitter 23 emits a laser pulse group, and the sampling circuit of count start signal 24 acquires the timing information of the emitting moment of each laser pulse, the logic control unit 41 controls the counter 42 to count the clock signal of clock generator after receives the timing information, current count value will be latched in the flip-latch 43 for further processing by MCU 15 when the laser pulse receiving unit 17 or the logic control unit 41 receives reflected laser pulse signals, if the latching time of count value is the moment that the logic control unit 41 receives the reflected laser pulse, a system processing delay time should be deducted in processing phase; during the signal receiving process, MCU 15 assigns different time-control time for each group of laser pulses, laser pulse signals get into the photoelectric conversion element D1 under the time-control time are shield automatically; during the emitting process, the time-interval measuring unit 13 controls the emitting time sequence of laser pulses;

Secondly, MCU 15 processes the count values output from the flip-latch 43, which are corresponding to every laser pulses, to obtain the flight distance of each laser pulses, namely, the distance measured values; the distance mode selection step is executed and circuit parameters, such as driving circuit, time-control time, which are the selected distance mode corresponding to are saved;

Thirdly, as to the reflected laser pulse signals including in the laser pulse group corresponding to determined distance mode, the time-interval measuring unit 13 computes to obtain the pulse width of emitting signals, and outputs the computation values to MCU 15; and then the sensitivity adjustment step is executed, if current receiving sensitivity is inappropriate, a processing result is output to the time-interval measuring unit 13, the time-interval measuring unit 13 outputs an adjusting signal to the D-A converter 34 according to the processing result, the comparator 34 adjusts the threshold voltage thereof according to the adjusting signal;

In the end, the distance measurement step is executed; the acquirement of distance measured values adopts the same method as the distance mode selection process aforementioned, the detailed execution steps of MCU 15 is described above.

Elements disposed in a portable and hand-hold laser ranger is preferable to be of low power waste, in order to decrease the power waste and extent the use time.

What is claimed is:

1. A method for laser ranging, which comprises the steps of:
    (1) Select a distance mode and then adjust the receiving sensitivity of reflected signal according to selected distance mode;
    (2) Set the number of laser pulse groups emitted during a measurement process as $G_D$, the number of laser pulses included in one laser pulse group as $I_D$, the maximum of absolute difference between two measured distance values arranged consecutively in first class receiving process as $D_A$, the maximum of absolute difference between two virtual distance values sequenced consecutively in second class receiving process as $D_B$, the minimum number of distance values included in an element association with maximum length gotten from each laser pulse group in the first class receiving process as D;

(3) Emit $G_D$ laser pulse groups to a target in a way of time diversity, each of said laser pulse group includes $I_D$ ranging pulses with the same period, said ranging pulses reflect by said the target and receive by a receiving circuit, $I_D$ measured distance values correspondence to each of said ranging pulses are obtained after computing, and then execute Step (4) and Step (5) in turn on each laser pulse group;

(4) First-class receiving process: arrange the $I_D$ measured distance values according to the numerical value thereof; compute the difference between two consecutive measured distance values; the measured distance values sequenced consecutively and whose absolute difference values are smaller than or equal to said maximum absolute difference value $D_A$ are combined in one element association, and the element association with maximum element quantity is set to be a maximum length element association $D_{max}$ of current group;

(5) Set the number of measured distance values included in said maximum length element association $D_{max}$ as x; compare x and set minimum number of distance values included in an element association with maximum length gotten from one laser pulse group D, if x≧D, the laser pulse group that said maximum length element association $D_{max}$ belongs to is effective; process said x measured distance values by means of mean smoothing, and then obtain a first-class distance computation value; save said first-class distance computation value and return to Step (3) to process the measured distance values obtained from the next group of laser pulses; if the laser pulse group processed in this step is the last group of laser pulse, execute the subsequent steps; if x<D, the laser pulse group that said maximum length element association $D_{max}$ belongs to is not effective, emit another group of laser pulse, and execute Step (4) and Step (5) in order to obtained $I_D$ measured distance values;

(6) Second class receiving process: arrange saved virtual distance values according to the numerical value thereof; compute the difference between two consecutive virtual distance values; the virtual distance values sequenced consecutively and whose absolute difference values are smaller than or equal to said maximum absolute difference value $D_B$ are combined in one element association, and the element association with the maximum element quantity is set to be a maximum length element association for second class receiving processing $D'_{max}$; the number of virtual distance values included in said maximum length element association $D'_{max}$ is set as y;

(7) Process said y virtual distance values by means of mean smoothing, and obtain a second class distance computation value, output said second class distance computation value as the result of current measurement process; end said measurement process.

2. The method for laser ranging as claimed in claim 1, wherein, the minimum number of distance virtual values included in said maximum length element association of the second class receiving process E and the time limit of one measurement $T_n$ are set in step (2), and the real-time timing variable t is initialized in step (2) as well, there is a step (6.1) executed between step (6) and step (7), which is, compare the number of distance virtual values included in said maximum length element association $D'_{max}$ and set minimum number of distance virtual values included in the maximum length element association of the second class receiving process E, if y<E, and the real-time timing variable t≧$T_n$, end current measurement and output an error indication.

3. The method for laser ranging as claimed in claim 2, wherein, a process is executed after at least one step of step (1) to step (7), which is, compare the real-timing variable t and set time limit of one measurement $T_n$, if t>$T_n$, the measurement is end and an overtime indication is output.

4. The method for laser ranging as claimed in claim 1, wherein, a process is executed after at least one step of step (1) to step (7), which is, compare the real-timing variable t and set time limit of one measurement $T_n$, if t>$T_n$, the measurement is end and an overtime indication is output.

5. The method for laser ranging as claimed in claim 1, wherein, said receiving sensitivity of reflected signal adjustment comprises the steps of:

(1) Set pulse-width reference values of reflected laser pulse signal correspondence to each of said distance modes, $Q_1$~$Q_a$, wherein, the distance mode Ai is corresponding to the pulse-width reference values of reflected laser pulse signal $Q_i$, i is a positive integer from 1 to a;

(2) Emit a laser pulse group, and then measure the pulse width WI(i) of reflected laser pulse signal, wherein, i is a positive integer from 1 to a;

(3) Compare said pulse width of reflected laser pulse signal WI(i) and the pulse-width reference value $Q_i$ of selected distance mode $A_i$, if WI(i)≦$Q_i$, the current sensitivity control parameter is fitness, end said receiving sensitivity of reflected signal adjustment; if WI(i)>$Q_i$, the current sensitivity control parameter is unfitness, adjust the sensitivity control parameter, and return to execute Step (2) and Step (3).

6. The method for laser ranging as claimed in claim 5, wherein, in Step (2), the select of said distance mode and the measurement of said pulse width WI(i) both are based on one laser pulse group.

7. The method for laser ranging as claimed in claim 5, wherein, in step (2), the select of said distance mode is base on a first laser pulse group, and the measurement of said pulse width WI(i) is base on a second laser pulse group emitted after said first laser pulse group.

8. The method for laser ranging as claimed in claim 5, wherein, the adjustment of sensitivity is made through adjusting the threshold voltage of a comparator.

9. The method for laser ranging as claimed in claim 1, wherein, the maximum of absolute jitter difference between two consecutive distance measured values is set as $D_s$ in Step (2), Step (5.1) and Step (5.2) are executed between Step (5) and Step (6), which are, (5.1) compute the jitter difference between two adjacent measured distance values after sequencing, the measured distance values sequenced consecutively and whose absolute jitter difference are smaller than or equal to said maximum of absolute jitter difference $D_s$ are combined in one element association, and the element association with the maximum element quantity is set to be a maximum length element association $D''_{max}$, set the number of measured distance values included in said maximum length element association $D''_{max}$ is z;

(5.2) compare z and set minimum number of distance approximations include in each of said laser pulse groups D, if z≧D, the laser pulse group including said maximum length element association $D''_{max}$ is effective, return to step (3) and process the measured distance values obtained by next group of laser pulses; if z<D, the laser pulse group including said maximum length element association $D''_{max}$ is no effective, emit another group of laser pulses, and execute Step (4) to Step (5.2) on obtained $I_D$ measured distance values.

10. The method for laser ranging as claimed in claim 1, wherein the selecting a distance mode comprising following steps of:
   (1) Divide the extreme measure distance Ia into a distance intervals $[0\sim I_1], (I_1\sim I_2), \ldots, (I_{a-1}\sim I_a)$, $I\in[0,a]$, each of said distance intervals is corresponding to one distance mode, which are $A_1\sim A_a$, $a\geq 1$, said distance modes $A_1\sim A_a$ are corresponding to a parameter configurations of ranging circuit;
   (2) Set a laser pulse group with $I_D$ laser pulses, divide said $I_D$ laser pulses into a sub-groups, each of which includes $I_g$ ranging pulses, namely, $I_D=a\times I_g$;
   (3) Select a distance mode which is correspondence to target distance interval, and then emit a sub-group of laser pulses to said distance interval; process the measured distance values reflected into said receiving circuit and got calculated distance values of said distance interval;
   (4) Compare said calculated distance values with the upper distance limit and the lower distance limit of said interval, if said calculated distance values are greater than said lower distance limit, and smaller than said upper distance limit as well, the target is in said distance interval, and the distance mode that said distance interval is correspondence to is chosen to be current operating mode for said target; or not, the target is not in said distance interval, select another distance interval as target distance interval, return to execute step (3).

11. The method for laser ranging as claimed in claim 10, wherein, the extreme flying distance of each sub-group of laser pulses is the upper distance limit of the distance interval which is correspondence to said sub-group.

12. The method for laser ranging as claimed in claim 11, wherein, a levels of drive current are adopted when a sub-groups of laser pulses are emitting respectively, the drive current used for emitting laser pulses to the distance interval which is nearer to the emitting point is smaller than the drive current used for emitting laser pulses to the distance interval which is farther to the emitting point.

13. The method for laser ranging as claimed in claim 10, wherein, a time-control times is set corresponding to said distance intervals respectively; laser pulses reflected into said receiving circuit in the corresponding time-control time of current distance interval are shielded as noisy signal; reflected signals getting into said receiving circuit after corresponding time-control time of current distance interval are regard as effective measured distance values, and calculated distance values of current interval are gotten by processing said effective measured distance values.

14. The method for laser ranging as claimed in claim 13, wherein, the time-control time corresponding to a farther distance interval from the emitting point of laser pulses is longer than the time-control time corresponding to a nearer distance interval to said emitting point.

15. The method for laser ranging as claimed in claim 10, wherein, said parameters configurations of ranging circuit at least include drive current for laser emitting, and said time-control time.

16. An apparatus for laser ranging, comprising:
   a power supply, supplying power to said apparatus for laser ranging;
   a laser pulse emitting unit, emitting laser pulse signals, said emitted laser pulse signals get to a target through lens;
   a laser pulses receiving unit, receiving signals getting into said apparatus for laser ranging;
   a receiving sensitivity adjusting unit, adjusting the receiving sensitivity of said laser pulse receiving unit, reflected laser pulses go through lens, said laser pulse receiving unit, and said receiving sensitivity adjusting unit connected with said laser pulses receiving unit in turn;
   a time-interval measuring unit, controlling the time-sequence of emitting laser pulse, computing the time-interval between the laser pulse emitting and the receiving thereof, measuring the pulse-width of reflected laser pulse signals, said time-interval measuring unit is connected with said laser pulse emitting unit and said receiving sensitivity adjusting unit;
   a micro-processor (MCU), connected with said time-interval measuring unit, said micro-processor (MCU) receives the information of emitting time-sequence, the time-interval of laser pulses, and the pulse-width of emitting signals, and moreover, chooses the distance modes, adjusts the receiving sensitivity, estimates the shaking-extent of measured distance values, and process the measured distance values of target to obtain ranging result according to received information and measured distance values.

17. The apparatus for laser ranging as claimed in claim 16, wherein, said laser pulse emitting unit comprises,
   a laser emitter, generating laser pulse signals;
   a switching circuit, connected with said laser emitter, when said switching circuit is on, said laser emitter emits laser pulses;
   a driving circuit, connected with said switching circuit, said driving circuit drives said laser emitter to emit laser pulse signal by controlling the on and off of said switching circuit, the output current of said driving circuit is one of diverse driving currents;
   a sampling circuit of count start signal, getting the time message of the emitting instant of laser pulse, and outputting said time message to said time-interval measuring unit.

18. The apparatus for laser ranging as claimed in claim 16, wherein, said laser pulse receiving unit comprises a photo-electric conversion element, which converts received laser signals to electrical signals; said receiving sensitivity adjusting unit comprises,
   an amplifying circuit, connected with said photoelectric conversion element, said amplifying circuit amplifies said electrical signals output from said photoelectric conversion element;
   a comparator, connected with said amplifying circuit, said comparator converts the analog signals output from said amplifying circuit to digital signals, and outputs said digital signals to said time interval measuring unit;
   a D-A converter, converting the digital control signals output from said time interval measuring unit to analog signals, and outputting which to said comparator;
   said time interval measuring unit computes the pulse-width values of said digital signals output from said comparator, and outputs an adjustment signal to said D-A converter according to the result thereof; said comparator adjusts the threshold voltage according to said adjustment signal.

19. The apparatus for laser ranging as claimed in claim 16, wherein, said time interval measuring unit comprises,
   a clock generator, generating clock signal;
   a timing and processing module, comprising, a logic control unit, connected with said micro-processor (MCU) and said laser pulse emitting unit, the input end of said logic control unit receives time message of an emitting instant of laser pulses;

a counter, controlled by said logic control unit to count said clock signal, the input end of said counter for inputting counting signals is connected with said clock generator, and the counting control end thereof is connected with said logic control unit;

a flip-latch, latching the count value of said counter, said flip-latch is connected with said micro-processor (MCU) through a paralleled to serial interface, and transmits said count value to said micro-processor (MCU) through said paralleled to serial interface, said micro-processor (MCU) computes to obtain distance value according to said count value;

said logic control unit controls the start-stop time of latching the emitted laser pulses of flip-latch according to the input time message of the emitting instance of laser pulses and the receiving time thereof.

* * * * *